J. G. NOLEN & J. SHEPHERD.
RESILIENT CONNECTION DEVICE FOR RELATIVELY MOVABLE PARTS.
APPLICATION FILED OCT. 8, 1906.
961,312. Patented June 14, 1910.
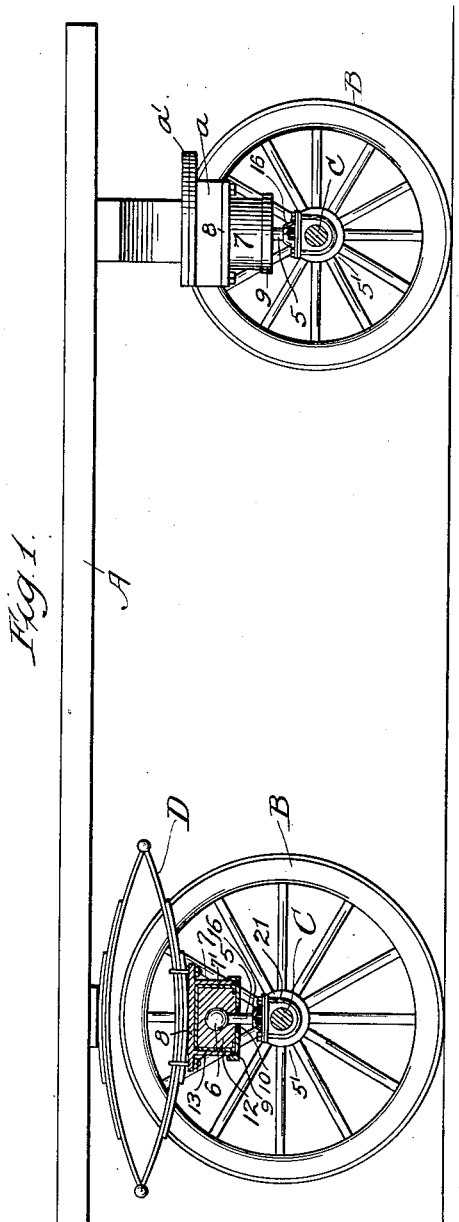
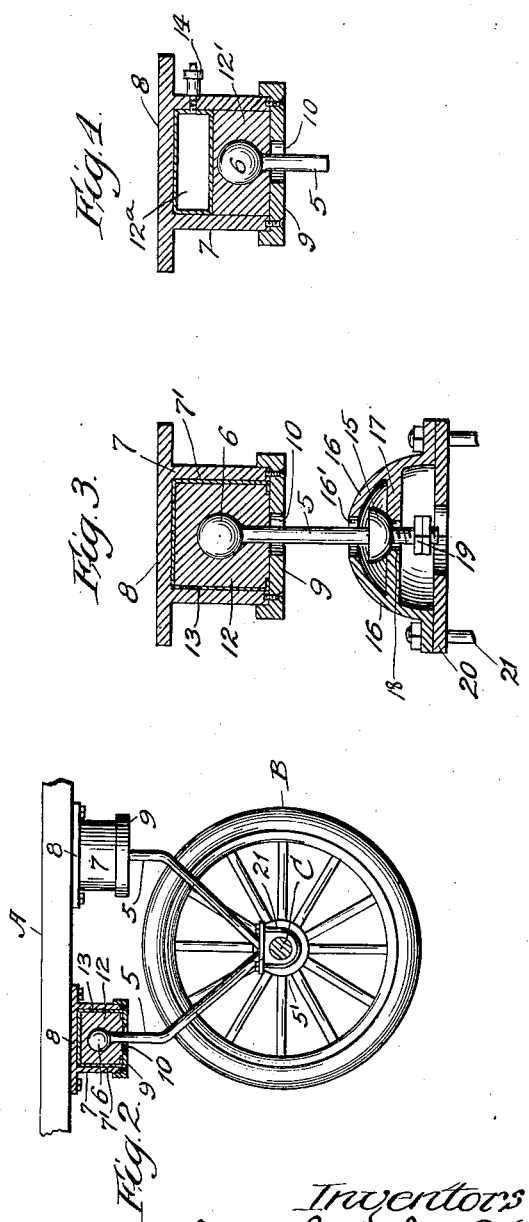

UNITED STATES PATENT OFFICE.

JAMES G. NOLEN AND JOHN SHEPHERD, OF CHICAGO, ILLINOIS; SAID NOLEN ASSIGNOR TO JOHN E. SHEPHERD, OF CHICAGO, ILLINOIS.

RESILIENT CONNECTION DEVICE FOR RELATIVELY MOVABLE PARTS.

961,312.  Specification of Letters Patent.  Patented June 14, 1910.

Application filed October 8, 1906. Serial No. 337,904.

*To all whom it may concern:*

Be it known that we, JAMES G. NOLEN and JOHN SHEPHERD, citizens of the United States, all residing at Chicago, in the county of Cook and State of Illinois, have invented certain new and useful Improvements in Resilient Connection Devices for Relatively Movable Parts, of which the following is a specification.

Our invention relates to improvements in resilient connection devices for relatively movable parts, and has for its primary object to provide a connection device for interposition between relatively movable parts, which will be resilient universally, or in every direction, to a greater or less degree, as desired, and we have for a particular object the provision of such device in form adapted for interposition between the wheels or running gear and the frame of an automobile or other vehicle, whereby the short vibrations imparted to the wheels and running gear may be taken up by the resilient connection, and the necessity of utilizing pneumatic tires to this end obviated.

It will be understood that we do not limit the application of our invention to this particular use, as it will be obvious from the appended description that our improved device is adapted for application under many conditions and to many classes of devices where resilient support, or suspension of a part, is desired, but by way of illustration we have herein shown in the drawing our invention as applied to vehicle construction.

Another salient object of our invention is to provide a device of the character described, which is simple in construction, easy of manufacture, cheap in cost and efficient and durable in operation.

Other and further objects of our invention will best become apparent to those skilled in the art from the following description taken in conjunction with the accompanying drawing, wherein, Figure 1 is a side view, with parts in section, of a wagon equipped with our invention. Fig. 2 is a fragmentary view showing a modified application of our invention in a wagon construction. Fig. 3 is a sectional detail of a universal resilient suspension and supporting device embodying our invention, and, Fig. 4 is a similar view of a modification thereof.

Throughout the drawings like characters of reference refer always to like parts.

The leading feature of our invention, in its different applications, is the provision of a headed stem member for association with one of the relatively movable parts, and a resilient cushion, associated with the other of the relatively movable parts, and connected with the headed stem in such manner as to make a joint therewith resilient in every direction.

In the specific embodiment shown 5 indicates a stem provided with a head 6, preferably spherical in contour, and 7 indicates a shell, preferably comprising a side wall, or walls 7', and a bottom 8, integrally or otherwise connected therewith, and a detachable cap 9 having a central aperture 10 therein, so that the shell is hollow and axially apertured. The head 6 and upper portion of the stem 5 project into the shell through the aperture 10 in the cap thereof, the head 6 being preferably located at about the middle of the shell. Between the bottom, side walls and cap of the shell on the one part, and the stem and head of the coacting member on the other, is interposed a cushion of some elastic or resilient medium, whereby there is formed between the two elements of the device substantially a universal joint, yieldingly held in its normal position but movable against the resilient resistance in every direction. Specifically in Fig. 3 the elastic or resilient medium interposed between the stem head and shell comprises a block of rubber 12, which may in practice be molded directly around the head 6 and stem 5, and made of suitable size and shape to interfit within the shell 7. For convenience in manufacture and use, the rubber block 12 is formed in a thimble 13 of thin metal, which may be left in place thereon, and which fits nicely within the shell 7. In Fig. 4 the portion of the shell immediately surrounding the head and stem and extending laterally to the side walls of the shell, is filled with a rubber block 12', above which is arranged an inflatable pneumatic cushion 12ᵃ having the usual valve 14 for inflation. Thus it will be seen that by the construction shown in Fig. 3 the movement of the head and stem relative to the shell, vertically upward or downward, laterally or obliquely in any direction, is resisted by a yielding body of the elastic rubber, while in Fig. 4 upward movement of the stem relative to the shell is resisted by the more yielding air cushion, while lateral movement of the head and stem are resisted by the relatively stiffer rubber 12'. It will be obvious that this form of support, or suspension, may be provided between relatively movable members in many classes of articles, but when applied to vehicles, as herein suggestively shown, the resilient device is interposed between the wheels or running gear and the frame or body.

In Fig. 1, A indicates the wagon body and B the wheels thereof, arranged as usual upon axles C. It will be understood that the stem 5 may be connected with the axle in any suitable manner, and the shell 7 may be in any way conveniently connected to the body of the vehicle to be supported. At the right end of Fig. 1 we have illustrated the application of the shell 7 direct to the cross bars $a$ whereon the fifth wheel $a'$ is mounted, such construction affording only the resilient connectors heretofore described, as an elastic connection between the running gear and the frame, but under many conditions, as in the application of our invention to automobiles and like vehicles, it may be desirable, as illustrated to the left in Fig. 1, to apply the shell 7 to a spring E of any desired character, susceptible of taking up the long vibrations occasioned in the usual manner by the running of the vehicle, the other side of such spring being connected to the vehicle bed A. Furthermore, as shown in Fig. 2, two of the resilient devices, as heretofore described, may be employed to connect a single point on the axle with the frame or its auxiliary devices, the preferred construction in such events comprising a pair of stems 5—5 arranged in generally V-form with their ends extending in parallelism, and each having association with a suitable shell and resilient cushion.

While the connection of the stem 5 with the axle of a vehicle may, as described, be made in any desired form, we prefer, as a further feature of our invention to provide on the stem near its extremity a semi-spherical foot 15, arranged round-side down, to provide a lower rounded bearing and an upper shoulder. Surrounding the foot 15 is a two-piece socket 16, having an apertured crown 16' which encircles the stem above the foot, and a step 17 above the plane of its bottom, whereon the foot 15 normally rests. The step is apertured as at 18 to receive the extremity of the stem 5, which is threaded and bears nuts 19. The socket shell may be mounted on a base 20 bearing on the axle, and secured, with respect to both the socket and the axle, by U-bolts 21. This form of foot connection allows the stem to rise and fall within the limits of separation of the crown and the step of the socket, and gives universal freedom, within limits, to the stem.

It will be seen that our improved device, when thus applied to vehicles, affords a means for taking up short vibrations in any direction, there being provided practically a universally resilient joint between the wheel axle and the vehicle body, such short vibrations being those for the taking up of which pneumatic tires are commonly employed in automobile construction and elsewhere. Thus the use of our invention, particularly in the form shown in Fig. 4, dispenses with the necessity of employing pneumatic tires upon vehicles.

While we have herein described in some detail a specific embodiment and application of our invention, we do not desire to be understood as limiting ourselves thereto, as it will be apparent that numerous changes might be made in the construction and application without departure from the spirit and scope thereof.

Having thus described our invention, what we claim and desire to secure by Letters Patent of the United States, is:

In a vehicle construction, a body, running gear, vibration absorbing cushions interposed between the body and running gear, each of said cushions comprising a stem 5, provided with a head at one end and a parti-spherical foot near the other end; a socket for said foot, providing an apertured seat for the foot wherein it may universally move, said seat being located above the base of the socket, means on the stem on the opposite side of the seat from the foot, for preventing withdrawal of the stem, a shell surrounding the head and a resilient body within the shell, wherein the head is embedded.

In testimony whereof we hereunto set our hands.

JAMES G. NOLEN.
JOHN SHEPHERD.

In the presence of—
Geo. T. May, Jr.,
Mary F. Allen.